J. B. ANDERSON.
MINE PULLEY.
APPLICATION FILED JULY 17, 1917.
1,274,836.
Patented Aug. 6, 1918.
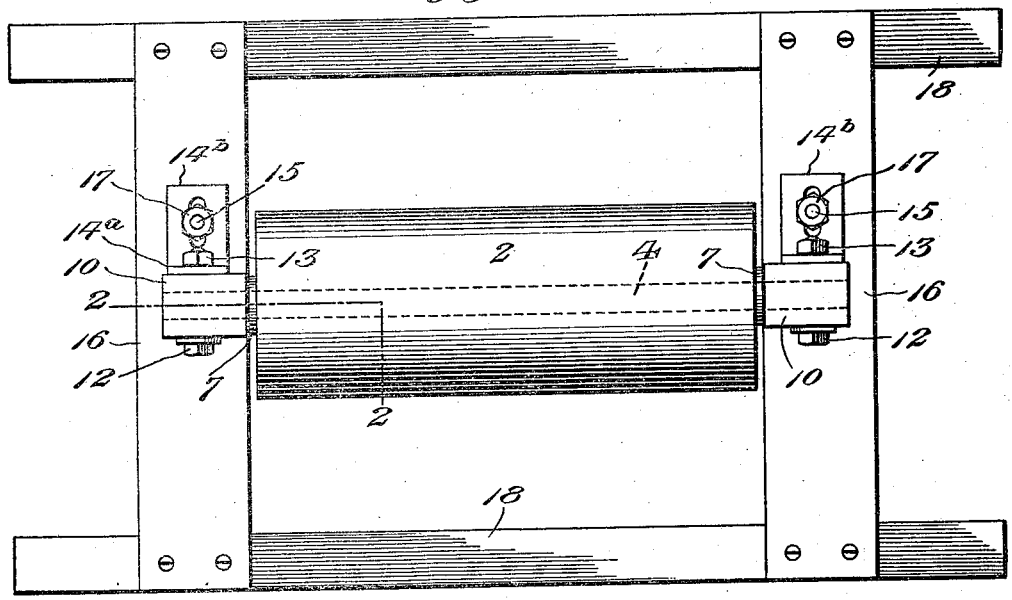
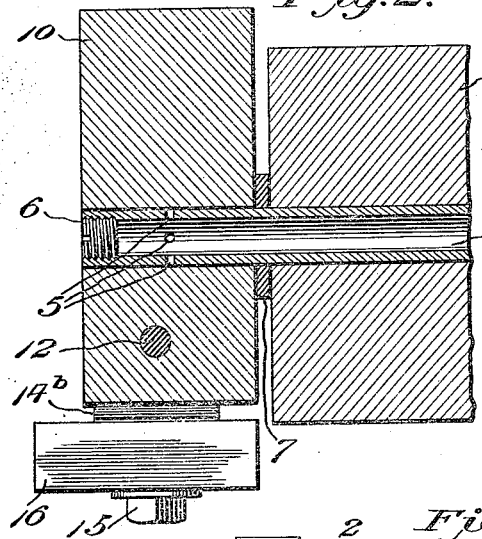
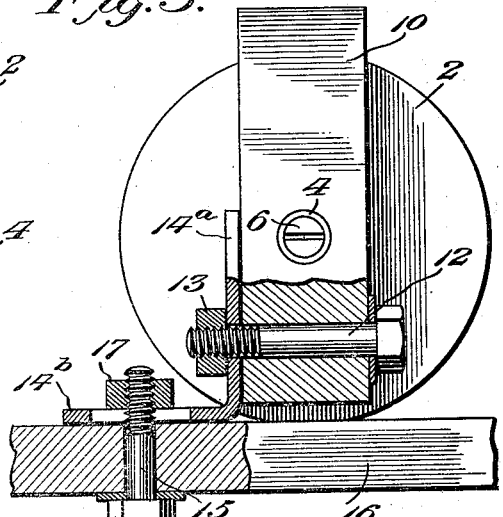
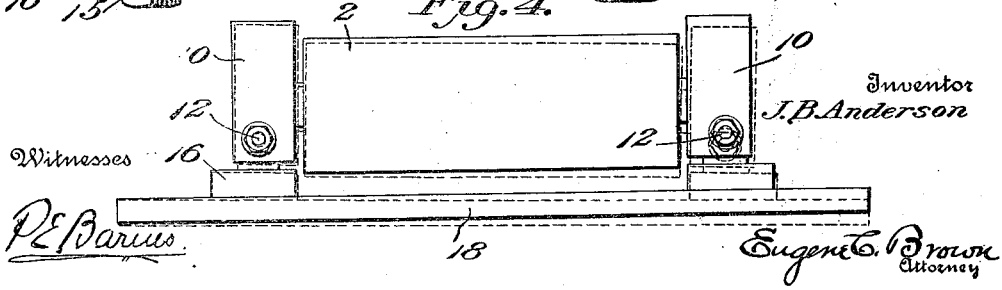
Witnesses
P. E. Barius
Inventor
J. B. Anderson
Eugene C. Brown
Attorney

UNITED STATES PATENT OFFICE.

JAMES BOYD ANDERSON, OF SHICKSHINNY, PENNSYLVANIA.

MINE-PULLEY.

1,274,836. Specification of Letters Patent. Patented Aug. 6, 1918.

Application filed July 17, 1917. Serial No. 181,153.

*To all whom it may concern:*

Be it known that I, JAMES BOYD ANDERSON, a citizen of the United States, residing at Shickshinny, in the county of Luzerne and State of Pennsylvania, have invented certain new and useful Improvements in Mine-Pulleys, of which the following is a specification.

My invention relates to improvements in pulleys or rollers which are especially adapted for use in supporting the hauling cables attached to mine cars to prevent the cable from chafing or cutting the ties and also to reduce the drag friction.

The main object of my invention is to provide mountings or bearings for such pulleys which will automatically adjust themselves into perfect alinement when the parts are assembled and placed in position and which may be accurately secured in alinement by tightening the fastening bolts. As is well known to engineers and particularly to those familiar with the work in mines, the ties upon which the rolls are secured are very frequently uneven and the road-bed is not as carefully leveled as in the usual railroad construction and, moreover, the roadbed is liable to become uneven, causing the ties to sag. For these reasons it is difficult to properly aline the bearings for the mine pulleys which are supported upon cleats or blocks secured to the ties and it frequently happens, therefore, that the bearing pins or gudgeons bind in the bearing blocks. Again any movements, due to sagging or other causes, will also result in causing a binding upon the gudgeon pins. My present invention overcomes all of these difficulties by providing a universal mounting for the bearing blocks which is self-alining. As soon as the securing bolts are loosened the mounting may, therefore, be readily placed in position by unskilled labor and the alinement of the bearings can be maintained when in use by periodically loosening the bolts to allow the bearings to automatically adjust themselves to any inaccuracies which may have occurred in the supporting blocks and then tightening them. This results not only in a great saving in the wear of the parts of the pulley and its bearings, but insures a minimum of drag friction upon the hauling cables attached to the mine cars.

In the accompanying drawings, Figure 1 is a top plan view of a mine pulley embodying my invention; Fig. 2 is an enlarged fragmentary vertical section on the line 2—2 of Fig. 1; Fig. 3 is an end elevation partly in section; and Fig. 4 is a diagrammatic side elevation.

The pulley or roller block 2 is preferably constructed of hard wood and is provided with metal gudgeon pins 4 which are preferably in tubular form and secured in sockets or recesses in the ends of the pulley block in the manner disclosed in my prior Patent 1,218,505. I prefer to provide a number of holes 5 in the pins and close the outer ends with screw plugs 6 so that the bore of the pins may be packed with bearing grease which will gradually be thrown outwardly through the holes 5 to thereby efficiently lubricate the bearings. The pulleys are spaced from the bearing blocks by washers 7 which are preferably passed upon the gudgeon pins to turn therewith.

The bearing blocks 10 are preferably rectangular and may be constructed of hard wood and are loosely supported upon a single bolt 12 which passes through a hole in the lower part thereof so that the block may have a free swivel movement on the bolt when the latter is loose. The bearing blocks are supported upon angle brackets, the upright leg 14$^a$ being provided with an aperture to receive the bolt 12 and the bottom leg 14$^b$ being provided with a slot to receive the bolt 15.

For the purpose of permitting the bearing blocks to automatically adjust themselves into perfect alinement, they are supported upon the bolts 12 so that there will be a space between the bottom of the blocks and the cleats 16 to which the angle brackets are secured. Thus if the pulley has been mounted upon the bracket with the bearings in perfect alinement when the parts were in the position shown in full lines in Fig. 4 and the ties 18 of the track should afterward sag to the position shown in dotted lines, the gudgeon pins of the pulley would bind in the bearing blocks. By loosening the nuts 13 on the bolts 12, the pressure along the gudgeon pins in the bearings of the bearing blocks will be equalized because the pins will cause the bearing blocks 10 to swivel on the bolts 12 until they are perfectly parallel with each other and the bearings will, therefore, be again in perfect alinement, the parts being then substantially in the position shown in dotted lines and inclined to accommodate themselves to the position of the ties. If, in addition to the lateral sagging of the track, there has been any longitudinal movement of one side of the track, thereby casing a twisting strain upon the bearings, this tension will be relieved by loosening the nuts 17 upon the bolts 15 and allowing the angle brackets to swivel horizontally upon the bolts. It will be apparent, therefore, that the bearings will automatically adjust themselves into perfect alinement by merely loosening the nuts 13 and 17, permitting the blocks 10 to swivel in a vertical plane upon the bolts 12 and the angle brackets to swivel in a horizontal plane upon the bolts 15. The parts may then be secured in their alined position by tightening the nuts 13 and 17. While the holes for the bolts 12 in the bearing blocks 10 can be accurately bored in the same position in each block, yet if there should be any slight inaccuracy in the position of the hole in one of the blocks, the parts will properly adjust themselves in the manner above described before the nuts have been tightened on the bolts. The slots in the bottom legs 14$^b$ of the angle brackets permit any small longitudinal adjustment of the brackets on the supporting cleats.

I have described the particular construction illustrated in the accompanying drawings in detail for the purpose of clearly disclosing an embodiment of my invention but it will be understood that various changes and modifications may be made within the scope of my invention.

I claim:—

1. A mine pulley or the like, comprising a pulley roller having gudgeon pins secured in the ends thereof, bearing blocks having bearings adapted to receive said pins, supports for said blocks, means for securing said blocks to said supports in a manner permitting adjustment in a vertical plane axially of the pulley, and means for securing said supports upon a base in a manner permitting a swiveling adjustment in a horizontal plane.

2. An adjustable bearing support for the gudgeon pins of a mine pulley or the like, comprising bearing blocks having bearings adapted to receive the gudgeon pins, supports for said blocks, means for pivotally supporting said blocks upon said supports permitting a movement in a vertical plane passing through the axis of the pulley, and means for securing the blocks in any adjusted position.

3. An adjustable bearing support for the gudgeon pins of a mine pulley or the like, comprising bearing blocks having bearings adapted to receive the gudgeon pins, angle brackets for supporting said blocks, and pivot bolts passing through apertures in said blocks and the upright legs of said brackets to permit a pivotal adjustment of the blocks in a vertical plane axially of the pulley.

4. An adjustable bearing support for the gudgeon pins of a mine pulley or the like, comprising bearing blocks having bearings adapted to receive the gudgeon pins, angle brackets for supporting said blocks, pivot bolts securing the bottom legs of said brackets to a base and permitting a swivel adjustment of the brackets in a horizontal plane, and pivot bolts passing through apertures in said blocks and the upright legs of said brackets to permit a pivotal adjustment of the blocks in a vertical plane axially of the pulley.

In testimony whereof I affix my signature in the presence of two witnesses.

JAMES BOYD ANDERSON.

Witnesses:
    JOHN T. REIDY,
    D. Z. MEUSCH.

Copies of this patent may be obtained for five cents each, by addressing the "Commissioner of Patents, Washington, D. C."